(12) United States Patent
Smith et al.

(10) Patent No.: US 12,395,445 B2
(45) Date of Patent: Aug. 19, 2025

(54) DYNAMIC SIZING OF A SHARE WINDOW

(71) Applicant: Lenovo (Singapore) Pte. Ltd., Singapore (SG)

(72) Inventors: Joshua Smith, Milton, FL (US); Richard Downey, Charlestown, IN (US); Travis Ennis, Jasper, IN (US); Matthew Fardig, Boonville, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 309 days.

(21) Appl. No.: 17/889,619

(22) Filed: Aug. 17, 2022

(65) Prior Publication Data
US 2024/0064108 A1 Feb. 22, 2024

(51) Int. Cl.
| | |
|---|---|
| *G06F 15/16* | (2006.01) |
| *H04L 47/27* | (2022.01) |
| *H04N 7/14* | (2006.01) |
| *H04N 7/15* | (2006.01) |

(52) U.S. Cl.
CPC .............. *H04L 47/27* (2013.01); *H04N 7/147* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 2023/0214958 A1* | 7/2023 | Zhang | G06T 3/40 345/671 |
| 2023/0281778 A1* | 9/2023 | Thorsson | G06T 7/0002 348/14.11 |

FOREIGN PATENT DOCUMENTS

| | | | | |
|---|---|---|---|---|
| WO | WO-2017088991 A1 * | 6/2017 | | G06F 3/1454 |

* cited by examiner

*Primary Examiner* — Joseph R Maniwang
(74) *Attorney, Agent, or Firm* — FERENCE & ASSOCIATES LLC (57) ABSTRACT

One embodiment provides a method, the method including: attending, over a communication medium, a virtual meeting comprising a presenter and at least one participant, each accessing the virtual meeting by use of an information handling device comprising a display; determining, based upon the information handling device of the at least one participant, a size of a share window on the display of the presenter's information handling device; and sharing, based upon the determined size of the share window, information present within the share window on the display of the presenter's information handling device to the display of the at least one participant's information handling device. Other aspects are claimed and described.

20 Claims, 4 Drawing Sheets

DYNAMIC SIZING OF A SHARE WINDOW

BACKGROUND

With the increase in people and users becoming geographically diverse, an increase in communications over different communication mediums has also been observed. Additionally, the features, functions, and reliability of the communication mediums has increased. One common increasingly popular communication medium is the use of video calls or conferences. This allows video of participants to be transmitted to other participants in the call or conference. Also, video or images of other things, such as an environment of the user, a desktop or objects on a display device of a user, and/or the like, can be transmitted to other participants.

BRIEF SUMMARY

In summary, one aspect provides a method, the method including: detecting, using a meeting window optimization system and during a meeting between a user and at least one participant located remotely with respect to the user, a request to share a screen of the user with the at least one participant, wherein each of the user and the at least one participant access the meeting utilizing an information handling device comprising a display; determining, using the meeting window optimization system and based upon characteristics of the information handling device of the at least one participant, a size of a region of the screen to be shared from the information handling device of the user; and sharing, using the meeting window optimization system, information contained within the region having the determined size to the information handling device of the at least one participant.

Another aspect provides a system, the system including: a processor; a memory device that stores instructions that, when executed by the processor, causes the system to: detect, using a meeting window optimization system and during a meeting between a user and at least one participant located remotely with respect to the user, a request to share a screen of the user with the at least one participant, wherein each of the user and the at least one participant access the meeting utilizing an information handling device comprising a display; determine, using the meeting window optimization system and based upon characteristics of the information handling device of the at least one participant, a size of a region of the screen to be shared from the information handling device of the user; and share, using the meeting window optimization system, information contained within the region having the determined size to the information handling device of the at least one participant.

A further aspect provides a product, the product including: a computer-readable storage device that stores executable code that, when executed by a processor, causes the product to: detect, using a meeting window optimization system and during a meeting between a user and at least one participant located remotely with respect to the user, a request to share a screen of the user with the at least one participant, wherein each of the user and the at least one participant access the meeting utilizing an information handling device comprising a display; determine, using the meeting window optimization system and based upon characteristics of the information handling device of the at least one participant, a size of a region of the screen to be shared from the information handling device of the user; and share, using the meeting window optimization system, information contained within the region having the determined size to the information handling device of the at least one participant.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The benefits surrounding the use of virtual meetings are vast. They permit participants to join a virtual meeting from any location, as long as connection to a network (e.g., Wi-Fi, cellular data) is available, allows a variable number of participants to join a virtual meeting, and permits participants to join the virtual meeting from one of a plurality of different devices (e.g., personal computer, smartphone, tablet, laptop, smart watch, etc.). Ultimately, convenience has made the use of virtual meetings common in a variety of situations requiring communication between two or more people. For example, a virtual meeting may be scheduled by a company that has employees in multiple states. Rather than flying-in and/or boarding the out-of-state employees in a single region to host an in-person meeting, the virtual meeting permits all employees/participants to join the meeting and communicate with one another from many different geographical and/or physical locations.

An additional feature of most virtual meetings is the ability to share images across a communication medium to assist with an explanation related to a topic. For example, a presenter in the virtual meeting can push a presentation to each device accessing the virtual meeting. This presentation may include imagery describing an invention and/or business process that a presenter will cover while discussing the presentation, and/or can include additional information not mentioned in the explanation provided by the presenter. Regardless of the type of information to be displayed on a device of a participant during a virtual meeting, each device may be instructed to display information supplied from a presenter's device. However, since a virtual meeting may be accessed by use of one of a plurality of devices, the characteristics of the devices used to access the meeting may be varied. This can result in sub-optimal display of information on the device of the participant(s).

In conventional methods, when attempting to overcome viewing issues for a participant, methods for adjusting what is displayed on a participant-specific device display from the presenter occur solely based upon a preference of the presenter. For example, one method for adjusting a display may include sharing the full screen of the presenter's device to ensure that all information is being provided to the participants of the virtual meeting. This method causes a participant accessing the meeting using a device that may include a smaller display to zoom-in and/or require additional input for the participant to clearly view the information being shared and displayed. Another example method includes the presenter selecting a specific window associated with one or more applications (e.g., word processing application, slide application, email application, etc.) and sharing a tab from a specific application (e.g., sharing a tab from a presenter's Internet browser).

Perhaps the most useful conventional method is the sharing of a specified portion of the presenter's display as selected by the presenter. A presenter may select a portion of the display that is smaller than the entirety of the display. This may attempt to account for an easiness to view the information at a participant device utilizing a display smaller than the full screen display of the presenter. However, since the presenter is unaware of what type of device each user is using to access the virtual meeting, the specified portion of the screen selected by the presenter to share the information can still cause issues when attempted to be viewed on another participant's device. Generally, when information is shared to other devices, the screen sharing feed may attempt to change the resolution of screen at the participant device. However, if the selected region does not result in a proportional screen resolution, the shared screen on the participant device results in the participant having to move the screen around, zoom-in or out, or perform other actions to see the entire shared screen.

Accordingly, the described system and method provides a technique for sharing information within a region on an information handling device of a user by determining the appropriate size of the predefined region based upon characteristics of the device of at least one participant receiving the shared information. A meeting window optimization system may detect a request to share a screen of a user with at least one other participant in a meeting, also referred to as a virtual meeting. The user will also be referred to as the presenter. However, it should be noted that the presenter can change between users during a single meeting. Each of the user and at least a portion of the participants access the meeting using an information handling device having a display.

The meeting window optimization system determines, based upon characteristics of the information handling devices of the participant(s), a size of a region of the screen of the user's information handling device to be shared. The region is also referred to as a share window for ease of readability. In other words, instead of the presenter specifying a size of the screen to be shared, the described system relies on information from the device(s) of the participant(s) to determine a size of the region to share. The characteristics of the participant device(s) may include a size, an aspect ratio, a resolution, and/or the like, of the display of the participant device(s).

In the case of more than one participant, the system may attempt to optimize the size of the region based upon characteristics of all of the participant device(s). For example, upon a participant electing to attend a virtual meeting, the system and method may determine which participant's device comprises and/or is coupled to a display which would result in the smallest size region to be shared from the user's device.

Therefore, a system provides a technical improvement over traditional methods for sharing display information over a virtual meeting by use of a communication medium by dynamically adjusting the size of a share window based upon characteristics of a participant device accessing the virtual meeting. Instead of relying on the presenter to decide the size of a region to be shared, the system relies on characteristics of the participant devices. This results in a more accurate selection of a size of the region to make for viewing the information on the participant devices easier. Thus, the system may adjust the size of the share window present on the presenter's device to ensure a high-quality viewing of the information being shared on the display of each participant's device.

The illustrated example embodiments will be best understood by reference to the figures. The following description is intended only by way of example, and simply illustrates certain example embodiments.

Figure 1:
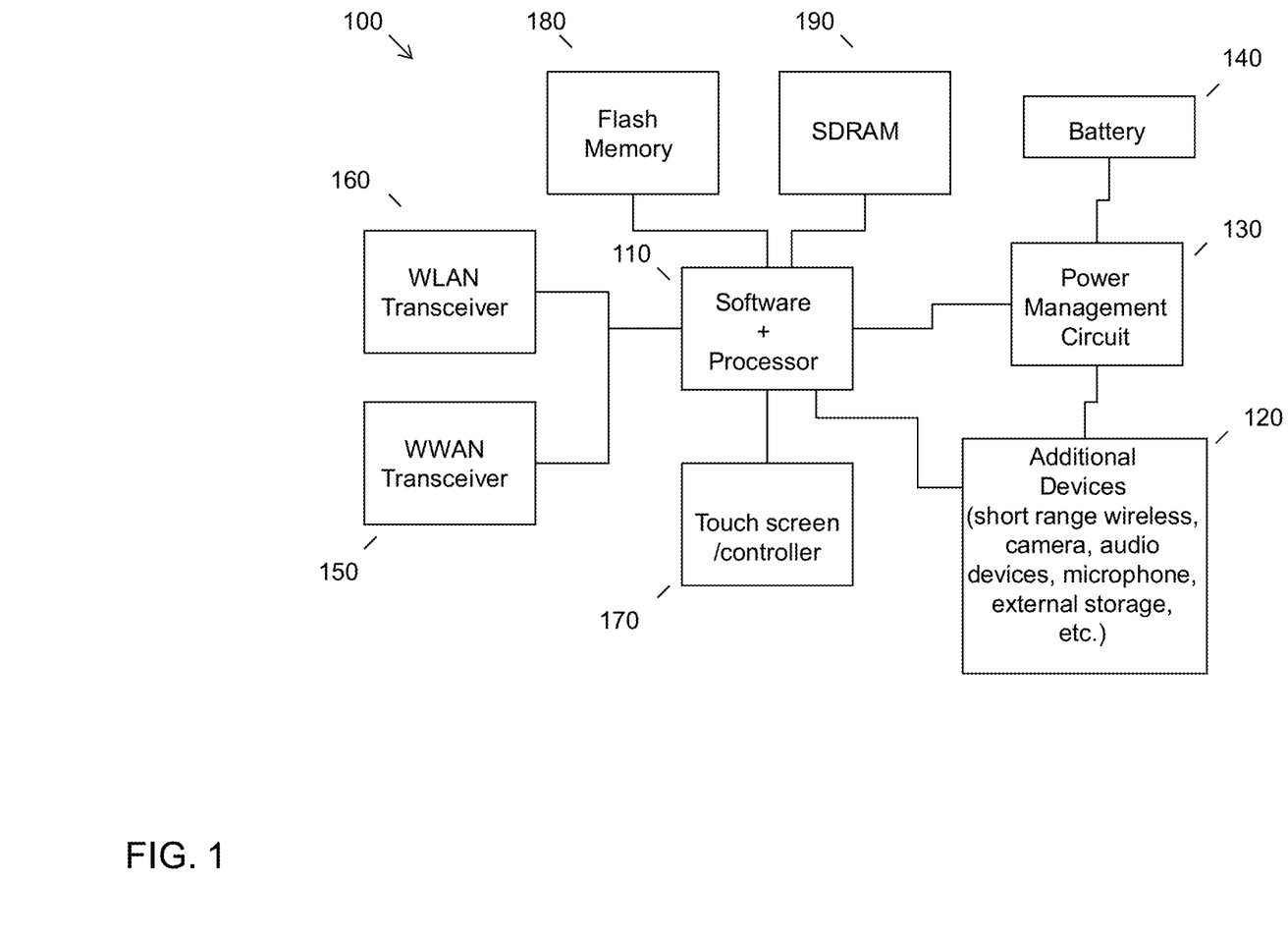
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
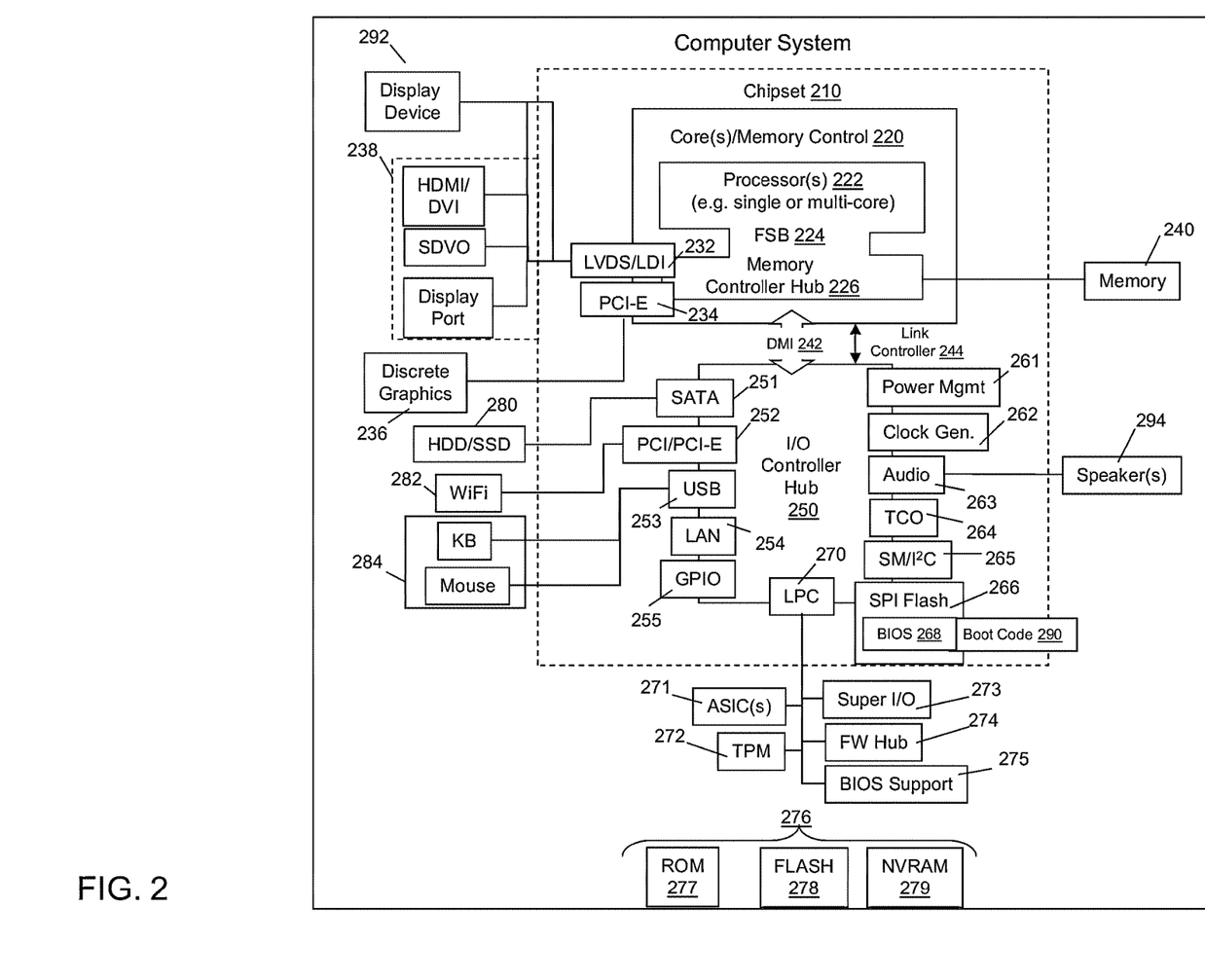
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems to access a virtual meeting through an information handling device or by a system to determine a size of a share region. For example, the circuitry outlined in FIG. 1 may be implemented in a tablet or smart phone embodiment, whereas the circuitry outlined in FIG. 2 may be implemented in a personal computer embodiment.

Figure 3:
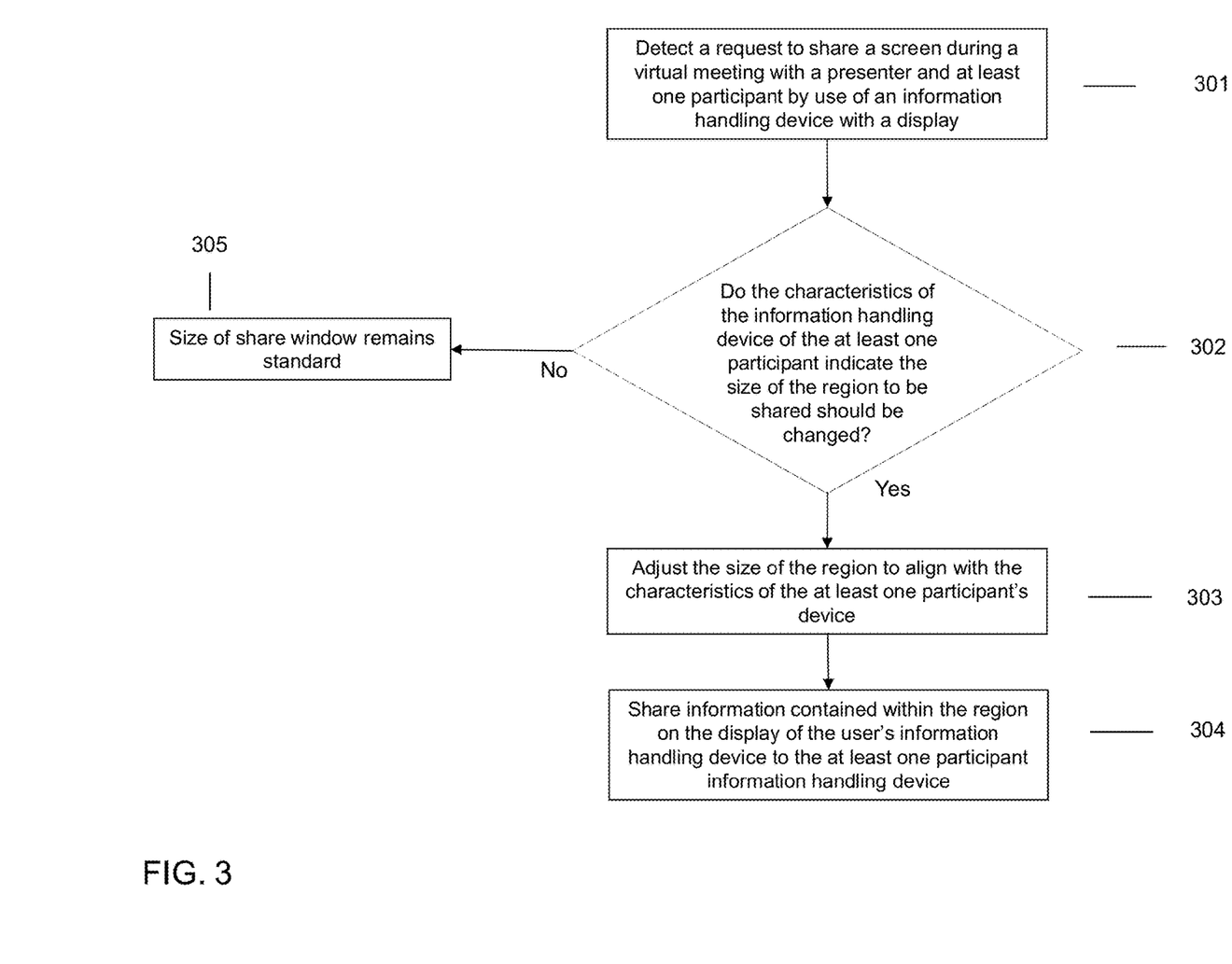
FIG. 3 illustrates an example method for sharing information within a region on an information handling device of a user by determining the appropriate size of the predefined region based upon characteristics of the device of at least one participant receiving the shared information.

FIG. 3 illustrates an example method for sharing information within a region on an information handling device of a user by determining the appropriate size of the predefined region based upon characteristics of the device of at least one participant receiving the shared information. The method may be implemented on a system which includes a processor, memory device, image capture devices, a communication medium, and/or other components, for example, those discussed in connection with FIG. 1 and/or FIG. 2. While the system may include known hardware and software components and/or hardware and software components developed in the future, the meeting window optimization system itself is specifically programmed to perform the functions as described herein to share information to be displayed on each participant device in a high-quality manner.

A communication medium may be a virtual meeting hosting application. Generally, the communication medium permits a plurality of users to join a virtual meeting from any location and using different information handling devices. For example, one participant may join a virtual meeting by use of a laptop computer, while another participant may attend the virtual meeting by use of a tablet. The communication medium may additionally include accessing an image capturing device and/or a camera embedded within and/or operatively coupled to the device a participant is using to access the virtual meeting. The image capture device may permit the system to provide a live view of each participant of the meeting. Additionally, the communication medium may include a feature for sharing information from a presenter's device to a device of a participant. Each attending participant may have the ability to share display information across the virtual meeting. Thus, the communication medium provides a mechanism for communicating between participants attending a virtual meeting both audibly and visually.

The communication medium may be used to establish a virtual meeting, and the system may thereafter detect when a participant joins and attends the virtual meeting. Each of the presenter and at least one participant may access and attend the virtual meeting by use of an information handling device with a display. It should be noted that multiple participants may be located at the same location and may, therefore, use a single information handling device for all participants, which may include the presented, at a single location. Generally, each information handling device includes at least one audio capturing device and/or at least one image capturing device on the participant-specific information handling device to detect when a participant is in attendance and communicating in the virtual meeting. The information handling devices may also include an audio output device and an image output device, in the form of a display. Additionally, the meeting window optimization system may obtain information handling device data, including characteristics of the information handling device and/or components coupled to the information handling device.

During the meeting, the meeting window optimization system may detect a request to share a screen of the user or presenter with the at least one participant at 301. Detecting a request to share a screen may include detecting a user input by the presenter that indicates a screen or portion of the screen should be shared with the participants. Generally, the virtual meeting software or application provides an input button or series of input commands that allow a user to share information from their display or screen to other participants connected to the meeting. Thus, when this input is detected, the meeting window optimization system can also detect the request to share the screen of the presenter.

Prior to or upon detecting the request to share the screen of the presenter, the meeting window optimization system may determine a size of a region of the screen to be shared from the information handling device of the user based upon characteristics of the information handling device(s) of the at least one participant. Accordingly, the meeting window optimization system may determine or identify characteristics of the information handling device(s) of the at least one participant that would influence a size of the region. The characteristics may include a resolution, aspect ratio, size, and/or the like, of the display of the information handling device(s) of the at least one participant. One technique for identifying these characteristics is to poll the device requesting the information. The device may then respond to the poll with the requested information.

The characteristics may also include a device type, which may include the device form (e.g., smart phone, tablet, laptop computer, personal computer, etc.), device model, device manufacturer, device operating system, and/or the like. Determining a device-type associated with a participant device may allow the system to determine characteristics of the display. For example, the system can use the device type to identify the resolution, aspect ratio, size, and/or the like, of the display. The device type may also identify characteristics of the device that may influence the size of the region, for example, bandwidth, installed applications, bezel size, and/or the like. The device type may be compared with a secondary source, for example, Internet search, database of devices and characteristics, data stores, and/or the like, to identify additional characteristics of the device.

This obtained information handling device data and characteristics may be utilized by the system when determining a size of a share window that may then be utilized by a presenter. Specifically, the meeting window optimization system may optimize the size of the region or share window based upon the characteristics of the information handling device(s) of the at least one participant. When determining a size of the share window, the meeting window optimization system determines if the characteristics of the information handling device of the at least one participant indicate the size of the region to be shared should be changed at 302. In other words, the meeting window optimization system may then determine if the characteristics of the display of the at least one participant's information handling device are different from the characteristics of the display of the presenter's information handling device such that information shared from the presenter's device would appear differently on the device of the participant(s).

When it is determined that the size of the region does not need to be changed the size of the share window remains at a standard size at 305. It should be noted that in some cases different characteristics between the presenter device and participant device may not result in a degradation of the shared information. This can happen when the devices have resolutions or aspect ratios that result in the ability to see all of the shared information without requiring the participant to take additional action to see the information. In this case, the size of the share window would not need changed. In another example, if the characteristics of the presenter's device would result in the smaller sized region as compared to the device of the participant(s), the system does not need to adjust the size of the share window.

In the system, the standard share window size may be the share window selected by the presenter, for example, the entirety of the presenter's screen, the application shared by the presenter, the region selected by the presenter, and/or the like. In the system, the standard share window size may be adjusted by the presenter and maintained on the display of the at least one participant information handling device. In other words, in the system, adjusting the size of the share window across multiple devices having the same size display will maintain a high-quality level of viewing.

When it is determined, at 302, that the size of the region should be changed, the meeting window optimization system may, at 303, adjust the size of the share window to align with the characteristics of the at least one participant's device. Determining the size of the share window and adjusting the size of the share window at 303 includes determining a size of a portion of the display of the presenter's device to be shared over the virtual meeting. Since there is a mismatch between the presenter's device characteristics and the participant's device characteristics, the size of the share window may be dependent on the characteristics of the participant's device. Specifically, the meeting window optimization system identifies a size of shared information that is supported by the participant device. This information is then used by the system to size a region of the presenter's device.

The size of the region is equal to a size that is supported by the participant device. In other words, the system determines the largest size that would be supported by the participant device and then designates this as the size of the region for the presenter's device. Alternatively, the system may select a size that is smaller than a size supported by the participant device. This may occur if additional information needs to be displayed on the participant device at the same time as the shared information. In other words, the system may take into account a context of the display of the participant device to determine the size of the region. If the shared information can only be displayed on half the display of the participant device, then the system may use this to determine the maximum size of the region.

Additionally, in the event that multiple participant devices are utilized, the system may take into account characteristics of all of the devices used to access the meeting in determining the size of the region. The meeting window optimization system may identify a maximum region size that is supported by each of the participant devices. The system may then identify the smallest of these maximum region sizes. This smallest region size would then be used as the controlling region size. In other words, the smallest region size would be set as the region size of the presenter device and all the participant devices would see a region size equal to this smallest region size. Instead of identifying a maximum region size supported by each participant device, the meeting window optimization system may identify the device or display that would result in the smallest size of the region and use that device to determine the size of the region. In other words, the system would not have to identify the size of the region for each device, but instead only determine which device or display would control the region size and then use that device or display to determine and control the region size.

After resizing the share window to align with the display of the at least one participant's device, the system may utilize the communication medium hosting the virtual meeting to share, at 304, information through the share window on the display of the presenter's information handling device to the devices of the participant(s). To assist in sharing the information, the meeting window optimization system may visually distinguish the region on the display of the presenter. In other words, the system may provide an indication on the display of the presenter that indicates what information will be shared. This indication may include an outline or other visual indicator on display that identifies the region. The region will be sized based upon the size identified at 303.

As different devices are added or removed from the meeting, the system may perform a new determination to determine if the size of the region can or should be modified to account for the change in devices. Additionally, if the presenter changes to a different participant or device, the system may perform the region size determination to make the determination for the new presenter device.

It should be noted that a participant or the presenter may provide input that can override the size of the region. For example, some information may not be accurately displayed at particular sizes. In the event that the region ends up within this size, the presenter may provide overriding input to resize the region to one that will support the information. As another example, a participant may use multiple devices to access the virtual meeting, for example, a smart phone with a display and a laptop with a display. The participant may be using one device to receive audio and one device to receive images. Accordingly, the participant may not want the device being used simply for audio transmission to control the size of the region. Thus, the participant may provide overriding input to indicate that a device should not be used in the region size determination.

Sharing the information present within the share window may include utilizing a drag-and-drop methodology for positioning the information to be shared from the presenter's device to the display of the at least one participant device. Specifically, the system may permit a selection and dragging of the information the presenter wishes to display into the share window, and then releasing or dropping the information into the share window. The information in the share window is thereafter shared to the at least one participant device. Additionally, or alternatively, the sharing of information present within the share window may include uploading information to the share window present on the display of the presenter's device. Uploading may include accessing a storage device accessible by the information handling device of the presenter, and selecting, from the information present within the storage device, information the presenter wishes to share with the participants.

Figure 4:
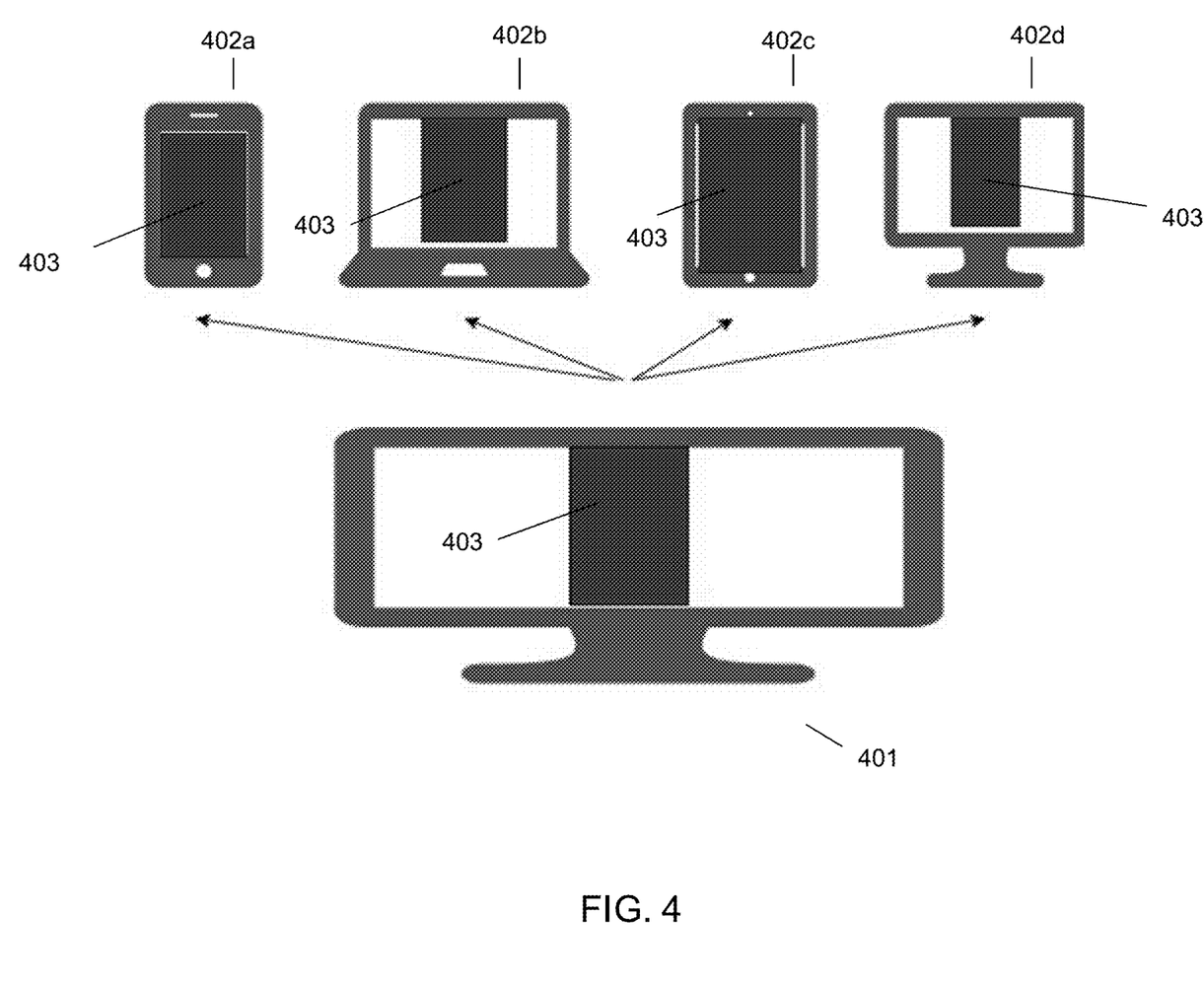
FIG. 4 illustrates an example system setup of a virtual meeting with a presenter device and a variety of participant devices and identifying a size of a predefined region based upon characteristics of the participant devices.

Referring now to FIG. 4, an illustration 400 of an example system setup including a presenter device 401 and four participant devices 402*a* (smartphone), 402*b* (laptop computer), 402*c* (tablet), and 402*d* (external monitor), currently attending a virtual meeting. As can be seen in FIG. 4, the smartphone 402*a* results in the smallest region of any other device present in the virtual meeting. The resulting display region size is represented by the darker portion 403 on each device. As mentioned previously, the size of the share window 403 will be maintained across each device attending a virtual meeting to account for a high-quality level for the imaging. Additionally, as can be seen in 401, 402*b*, 402*c*, and 402*d*, the white portions of the display are not included in the share window 403, illustrating that only a portion of each display, including the display of the presenter's device 401, is utilized when sharing information to be displayed on a device, except in the case of 402*a* where the entirety of the screen is consumed by the shared information contained within the share window of the presenter device 401.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, using a meeting window optimization system and during a meeting between a user and at least one participant located remotely with respect to the user, a request to share a screen of the user with the at least one participant, wherein each of the user and the at least one participant access the meeting utilizing an information handling device comprising a display;
   determining, using the meeting window optimization system and based upon a device-type of the information handling device of the at least one participant, a size of a region of the screen to be shared from the information handling device of the user, wherein the determining the device-type of the information handling device of the at least one participant comprises determining characteristics of the display of the information handling device of the at least one participant, wherein the characteristics of the display influence the size of the region to be shared and a visual quality level of information contained within the region, wherein the determining the size of the region of the screen to be shared from the information handling device of the user to the information handling device of the at least one participant comprises determining a context of the display of the information handling device of the at least one participant; and
   sharing, using the meeting window optimization system, the information contained within the region having the determined size to the information handling device of the at least one participant.

2. The method of claim 1, wherein the determining comprises identifying a resolution of the display of the information handling device of the at least one participant.

3. The method of claim 1, wherein the determining comprises identifying an aspect ratio of the display of the information handling device of the at least one participant.

4. The method of claim 1, wherein the determining comprises identifying a size of the display of the information handling device of the at least one participant.

5. The method of claim 1, wherein the determining comprises optimizing the size of the region based upon the characteristics of the information handling device of the at least one participant.

6. The method of claim 1, comprising visually distinguishing the region on the display of the information handling device of the user.

7. The method of claim 1, wherein the at least one participant comprises a plurality of participants.

8. The method of claim 7, wherein the determining comprises identifying a display of the plurality of participants resulting in a smallest size of the region and wherein the size of the region corresponds to the smallest size.

9. The method of claim 1, comprising receiving a user input overriding a size of the region.

10. The method of claim 1, wherein the sharing the information contained within the region comprises utilizing a drag-and-drop methodology for positioning the information to be shared in the region.

11. A system, the system comprising:
    a processor;
    a memory device that stores instructions that, when executed by the processor, causes the system to:
    detect, using a meeting window optimization system and during a meeting between a user and at least one participant located remotely with respect to the user, a request to share a screen of the user with the at least one participant, wherein each of the user and the at least one participant access the meeting utilizing an information handling device comprising a display;
    determine, using the meeting window optimization system and based upon a device-type of the information handling device of the at least one participant, a size of a region of the screen to be shared from the information handling device of the user, wherein the determining the device-type of the information handling device of the at least one participant comprises determining characteristics of the display of the information handling device of the at least one participant, wherein the characteristics of the display influence the size of the region to be shared and a visual quality level of information contained within the region, wherein the determining the size of the region of the screen to be shared from the information handling device of the user to the information handling device of the at least one participant comprises determining a context of the display of the information handling device of the at least one participant; and share, using the meeting window optimization system, information contained within the region having the determined size to the information handling device of the at least one participant.

12. The system of claim 11, wherein to determine comprises to identify a resolution of the display of the information handling device of the at least one participant.

13. The system of claim 11, wherein to determine comprises to identify an aspect ratio of the display of the information handling device of the at least one participant.

14. The system of claim 11, wherein to determine comprises to identify a size of the display of the information handling device of the at least one participant.

15. The system of claim 11, wherein to determine comprises to optimize the size of the region based upon the characteristics of the information handling device of the at least one participant.

16. The system of claim 11, comprising to visually distinguish the region on the display of the information handling device of the user.

17. The system of claim 11, wherein the at least one participant comprises a plurality of participants.

18. The system of claim 17, wherein to determine comprises to identify a display of the plurality of participants resulting in a smallest size of the region and wherein the size of the region corresponds to the smallest size.

19. The information handling device of claim 11, wherein to share the information contained within the region comprises utilizing a drag-and-drop methodology for positioning the information to be shared in the region.

20. A product, the product comprising:
a computer-readable storage device that stores executable code that, when executed by a processor, causes the product to:
detect, using a meeting window optimization system and during a meeting between a user and at least one participant located remotely with respect to the user, a request to share a screen of the user with the at least one participant, wherein each of the user and the at least one participant access the meeting utilizing an information handling device comprising a display;
determine, using the meeting window optimization system and based upon a device-type of the information handling device of the at least one participant, a size of a region of the screen to be shared from the information handling device of the user, wherein the determining the device-type of the information handling device of the at least one participant comprises determining characteristics of the display of the information handling device of the at least one participant, wherein the characteristics of the display influence the size of the region to be shared and a visual quality level of information contained within the region, wherein to determine the size of the region of the screen to be shared from the information handling device of the user to the information handling device of the at least one participant comprises determining a context of the display of the information handling device of the at least one participant; and
share, using the meeting window optimization system, information contained within the region having the determined size to the information handling device of the at least one participant.

* * * * *